INVENTOR.
JEAN LEBLOND

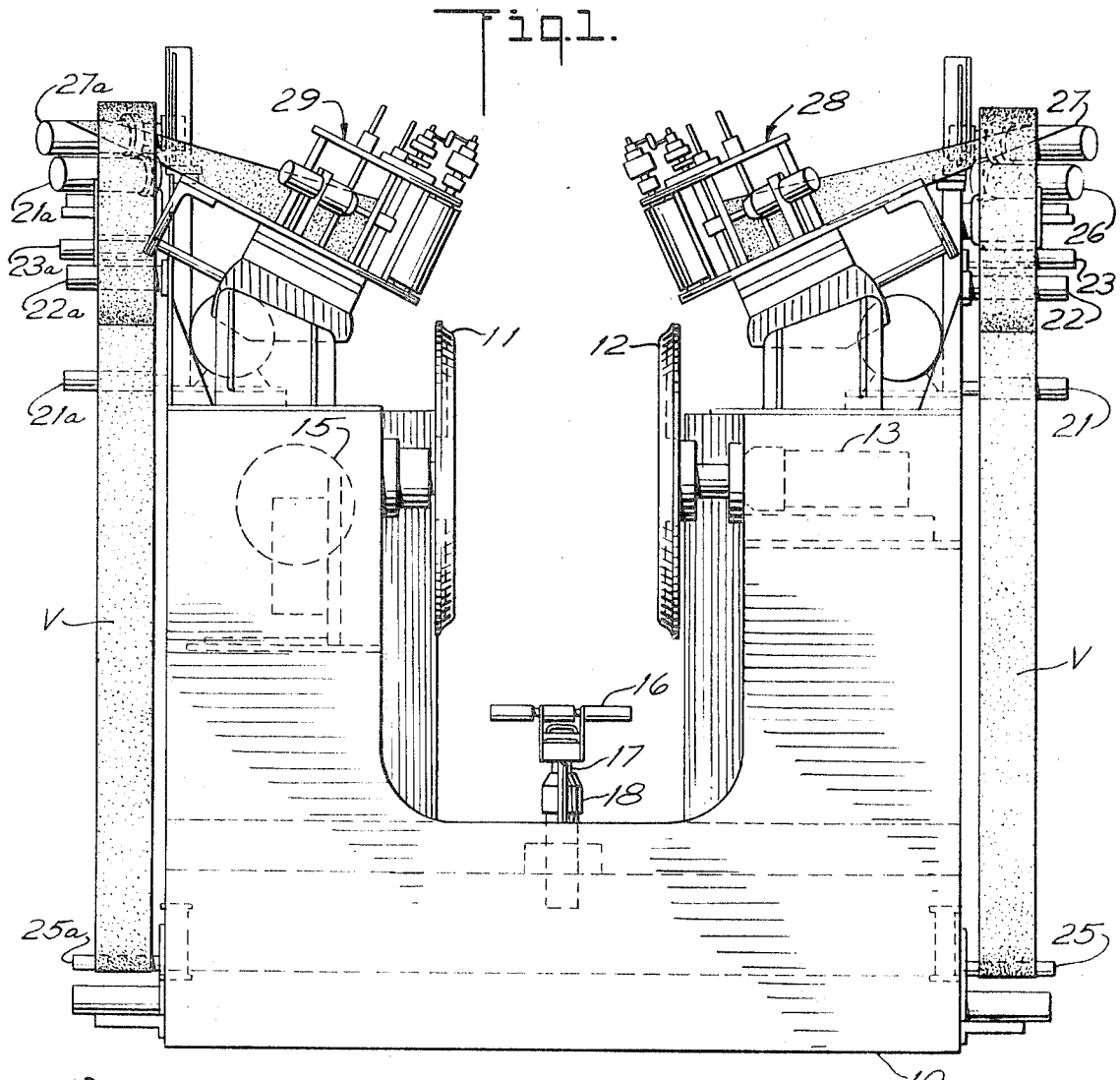
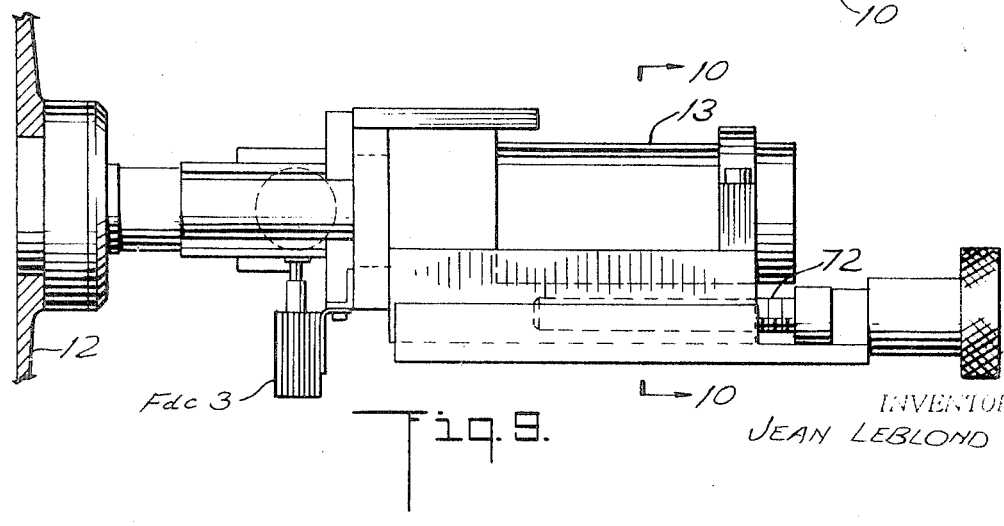

INVENTOR.
JEAN LEBLOND

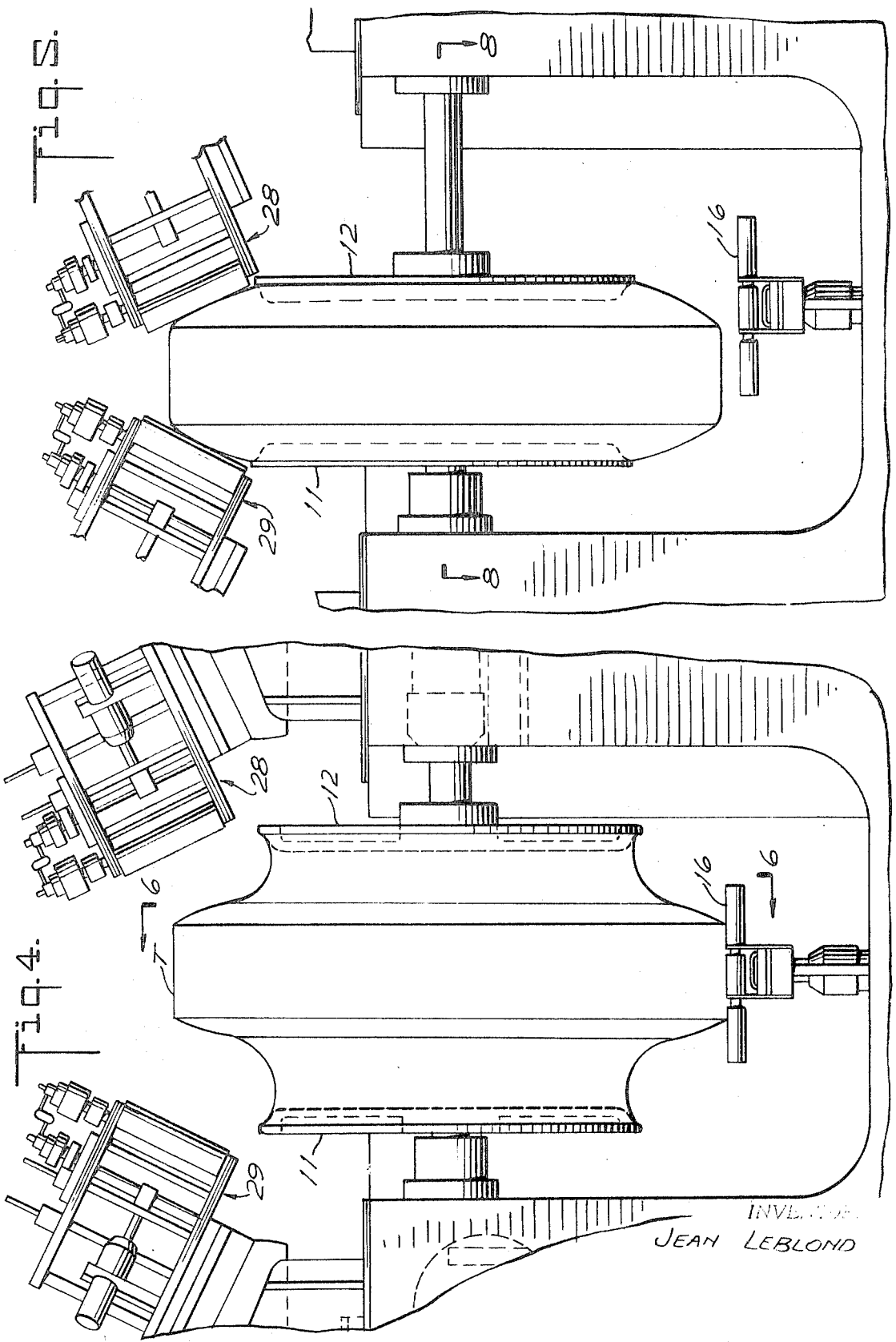

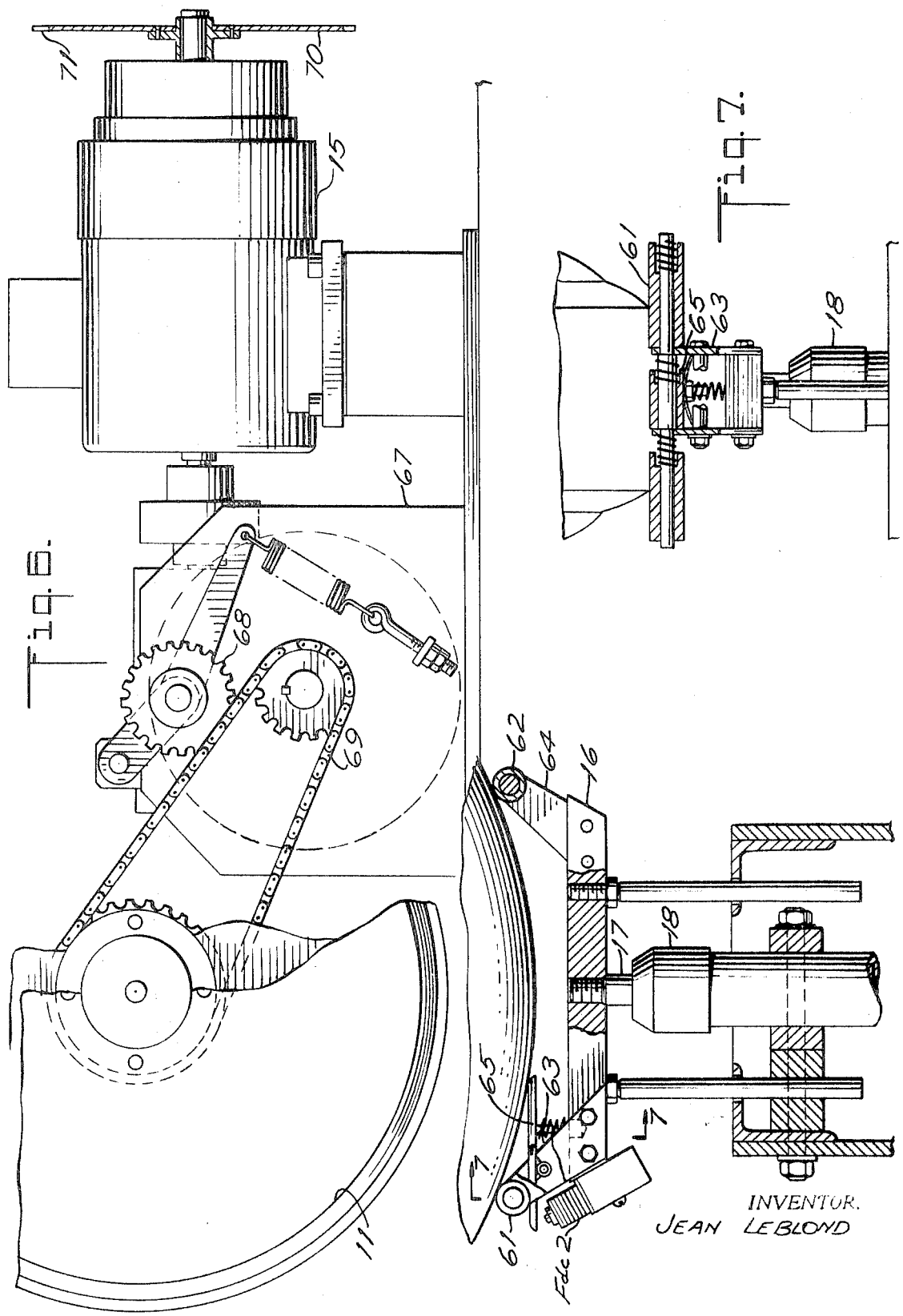

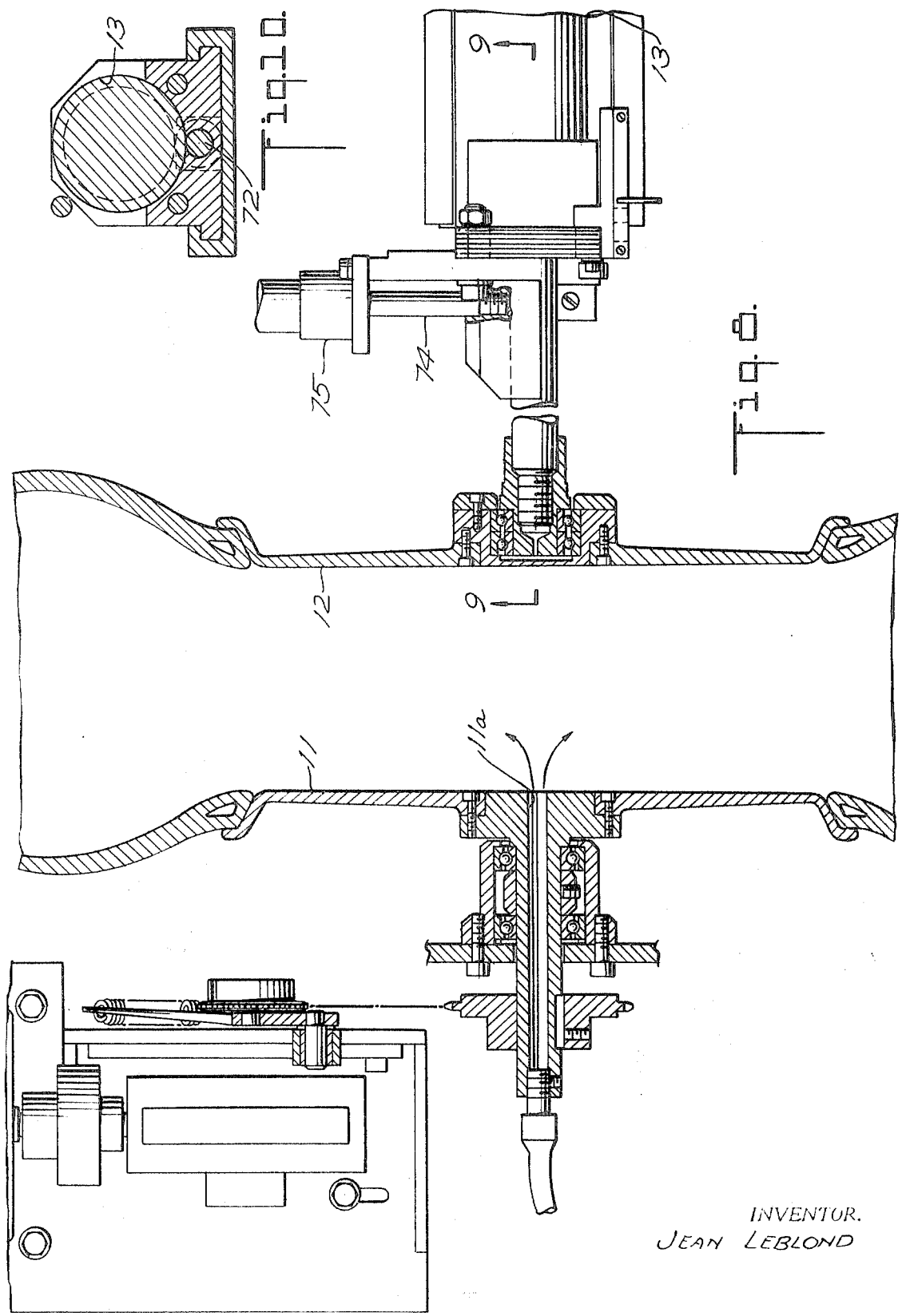

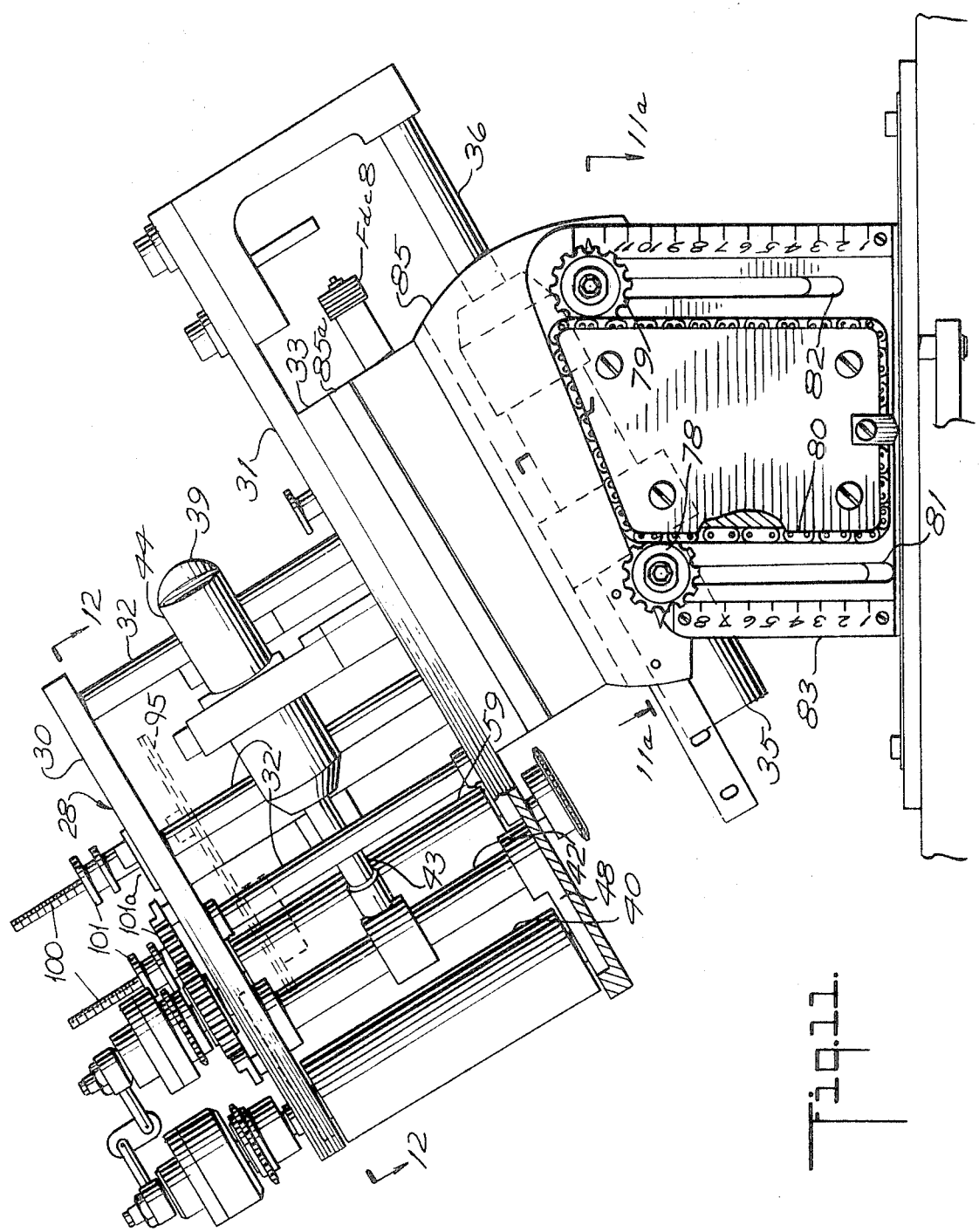

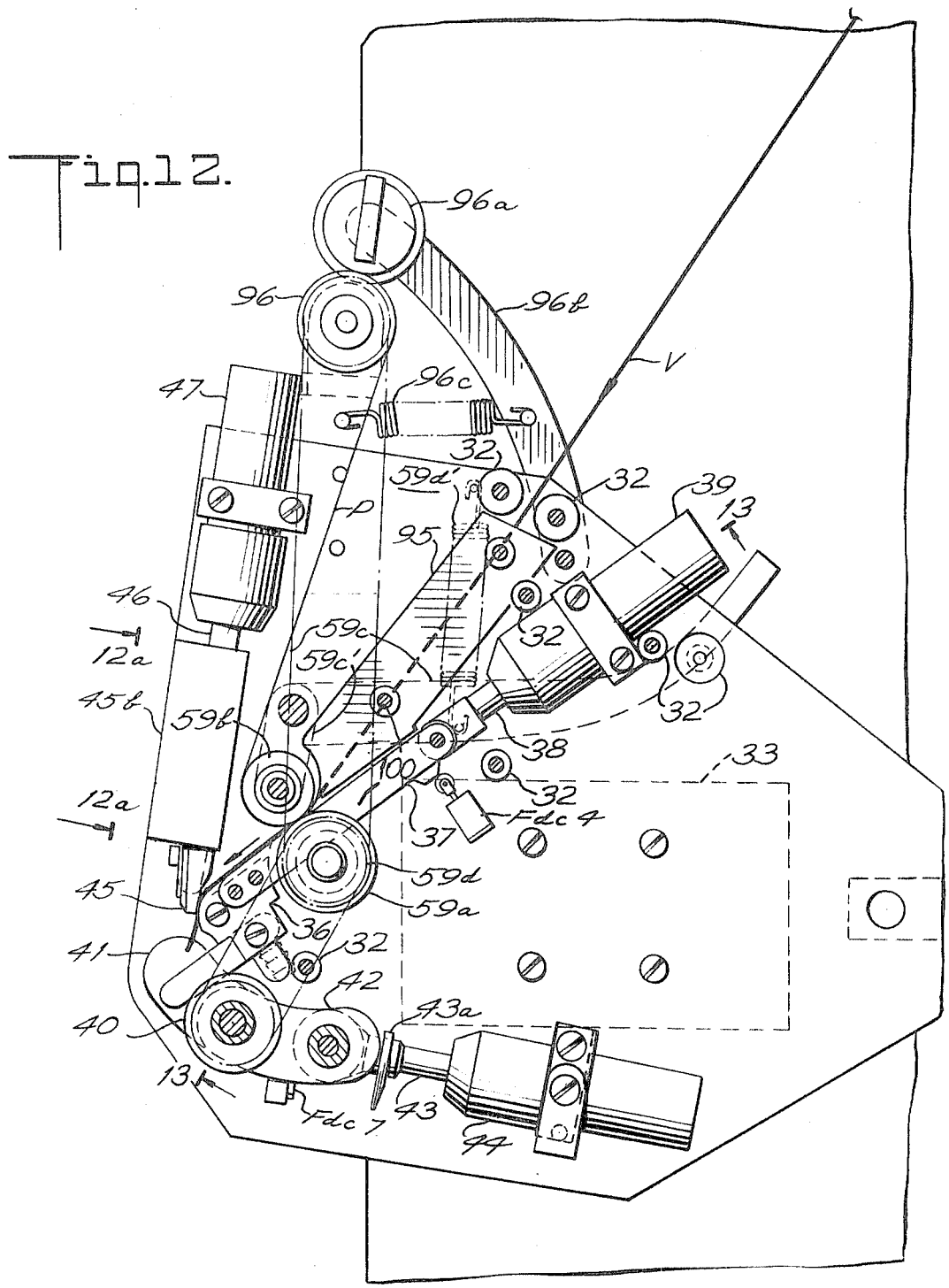

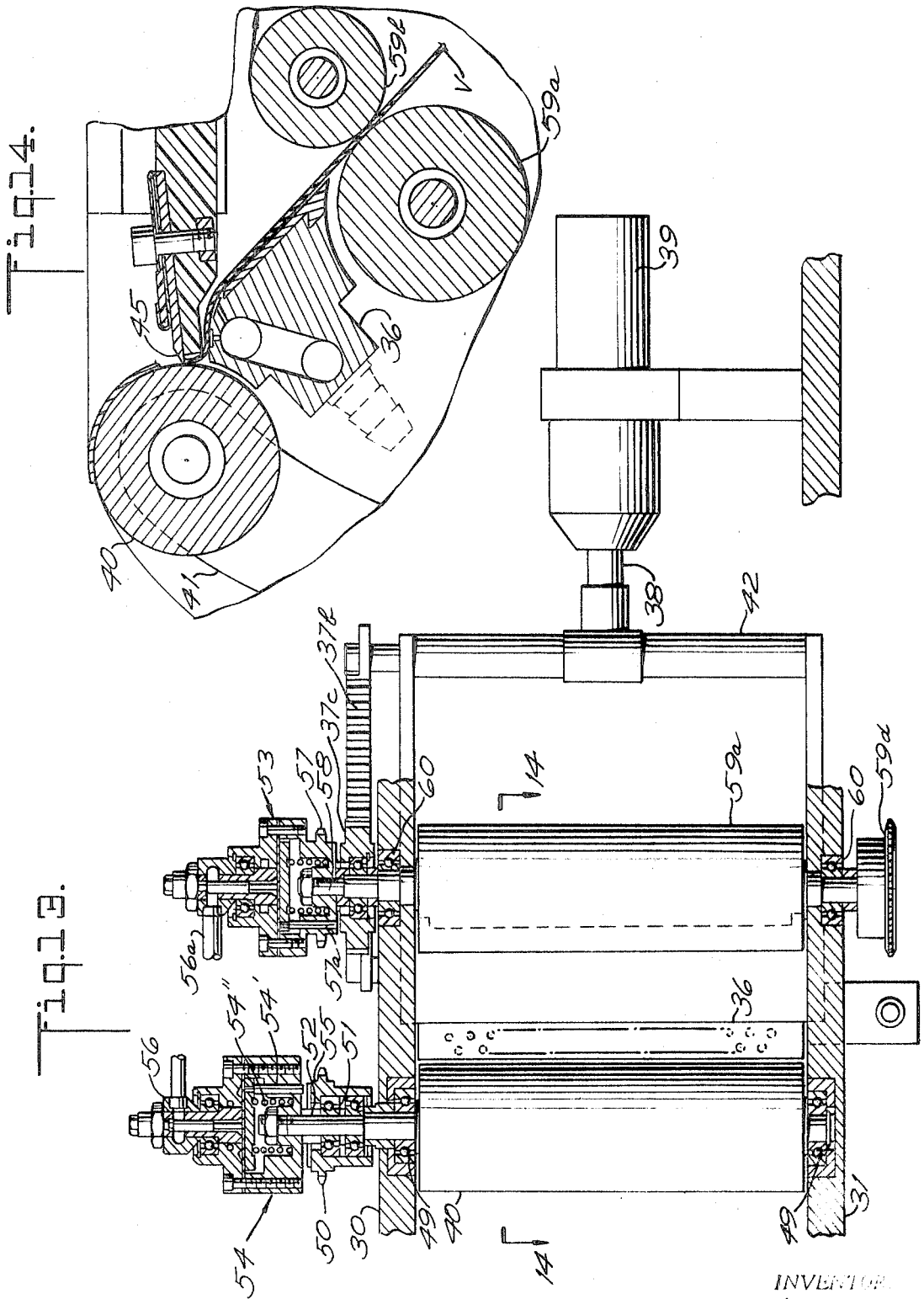

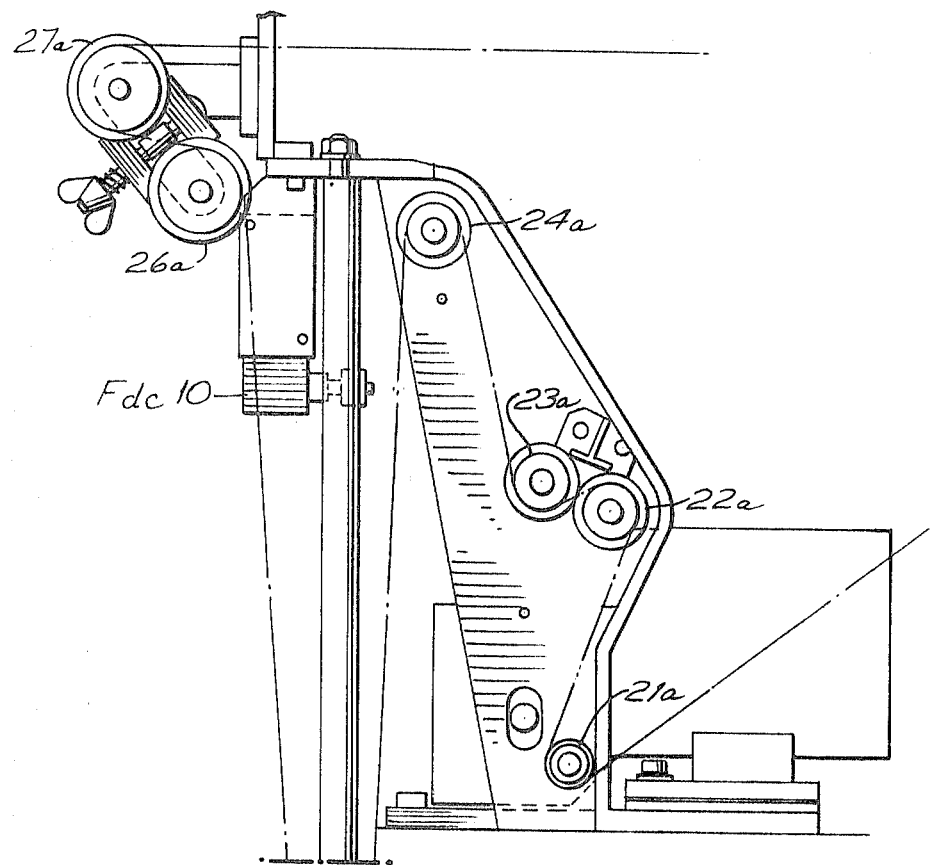
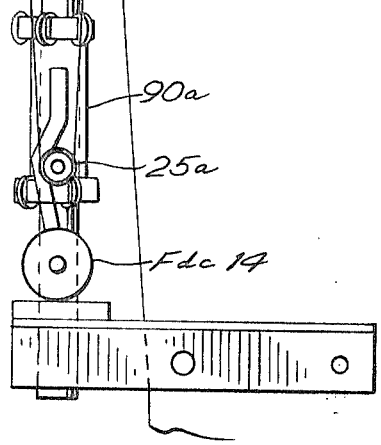
Fig.15.
INVENTOR.
JEAN LEBLOND

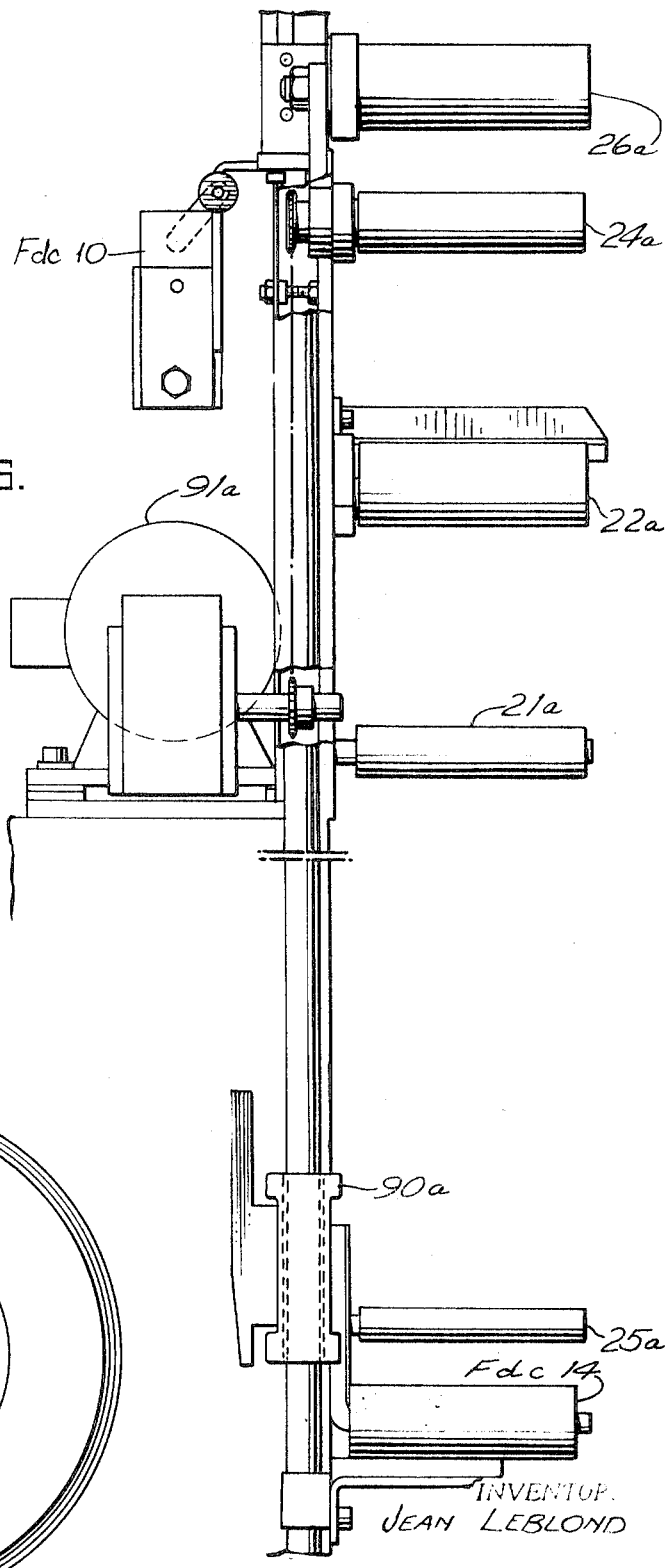

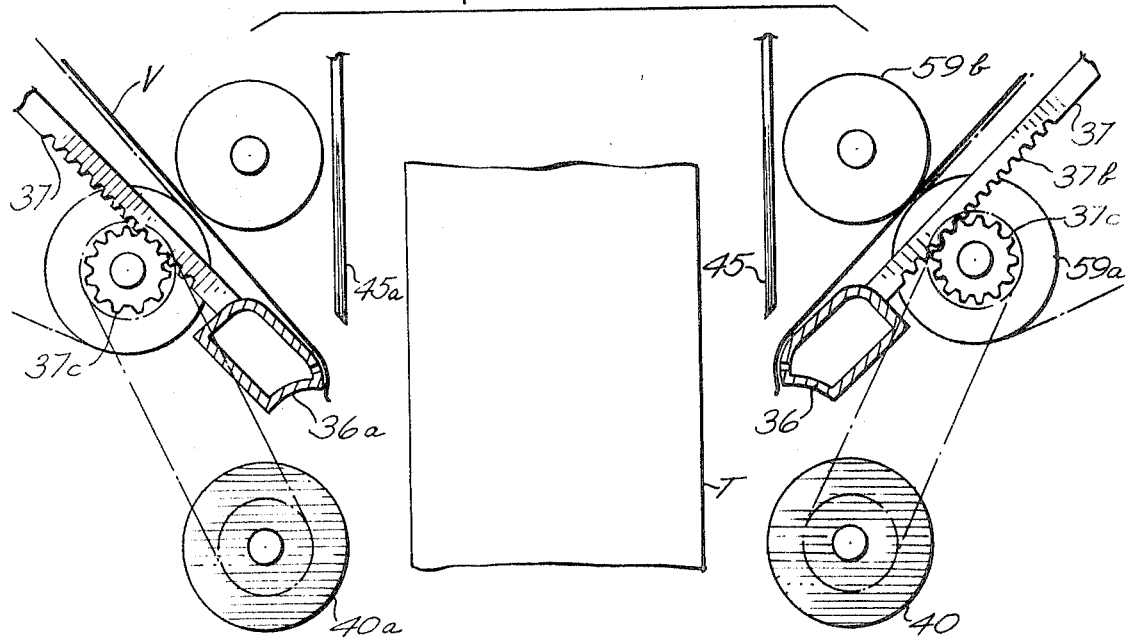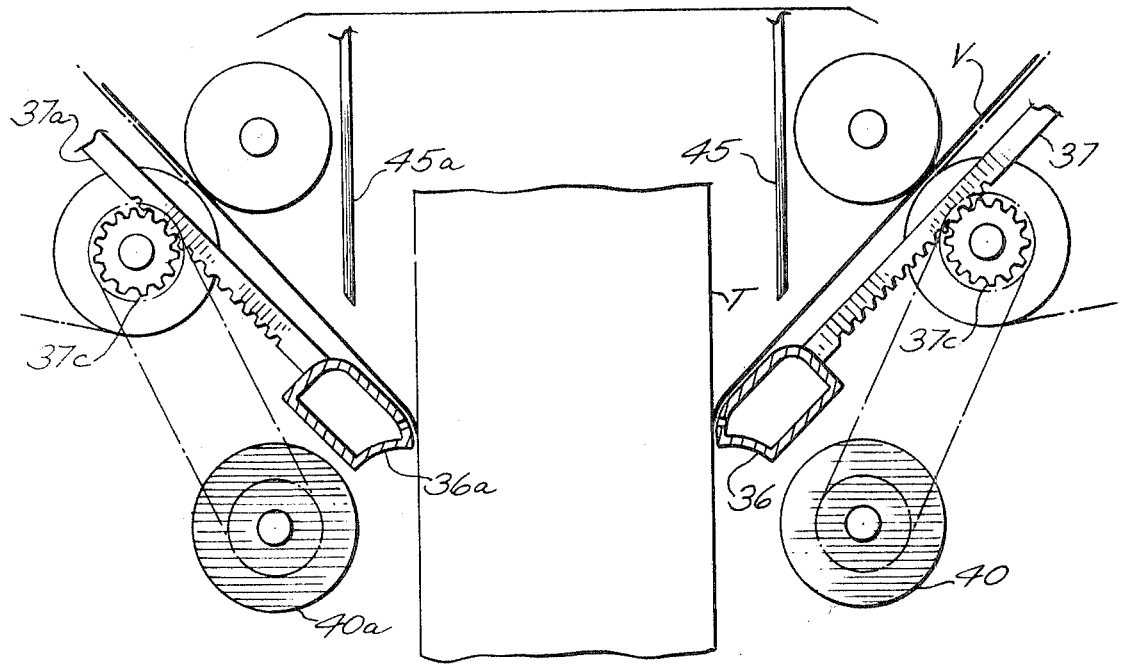

INVENTOR.
JEAN LEBLOND

United States Patent Office 3,595,724
Patented July 27, 1971

3,595,724
TIRE MATERIAL APPLYING APPARATUS
Jean Leblond, Compiegne, France, assignor to Uniroyal Englebert France S.A., Paris, France
Filed Nov. 6, 1967, Ser. No. 680,730
Claims priority, application France, Mar. 29, 1967, 100,720
Int. Cl. B29h 17/08
U.S. Cl. 156—405     15 Claims

ABSTRACT OF THE DISCLOSURE

Apparatus for applying a layer of sheet material to a supporting surface. The apparatus applies the leading edge of the sheet material to the supporting surface, rotates the supporting surface a predetermined angular amount to apply trailing portions of the sheet material to a predetermined angular portion of the supporting surface, presses the sheet material onto the rotating supporting surface, and cuts the sheet material in the region of, but spaced from, the supporting surface, whereafter the trailing edge of the cut sheet material is applied to the supporting surface.

---

This invention relates to apparatus for applying a layer of sheet material to a supporting surface, and, more particularly, to apparatus for applying a layer of rubber to each sidewall of a tire carcass.

During the manufacture of some tires, particularly radial ply tires, it is customary to apply an outer layer of rubber sheet material over the sidewall region. While there have been prior apparatus for applying various types of sheet materials to tires, such apparatus generally have not been fully automatic and require, for example, manual cutting of the sheet material to the desired length.

It is an object of the present invention, therefore, to provide a new and improved apparatus for applying a layer of sheet material to a supporting surface.

It is another object of the invention to provide a new and improved apparatus for applying a rubber layer to each sidewall of a tire carcass and for automatically adhering the rubber layers to the sidewalls and for automatically cutting the layers to desired length.

In accordance with the invention, apparatus for applying a layer of sheet material to a supporting surface comprises means for applying the leading edge of the sheet material to the supporting surface and means for rotating the supporting surface to apply the sheet material around the surface. The apparatus also includes means for pressing the sheet material onto the rotating supporting surface. The apparatus also includes control means for controlling the rotating means to stop the rotation of the supporting surface after a predetermined amount of rotation. The apparatus also includes means for cutting the material on the pressing means.

Figure 2:
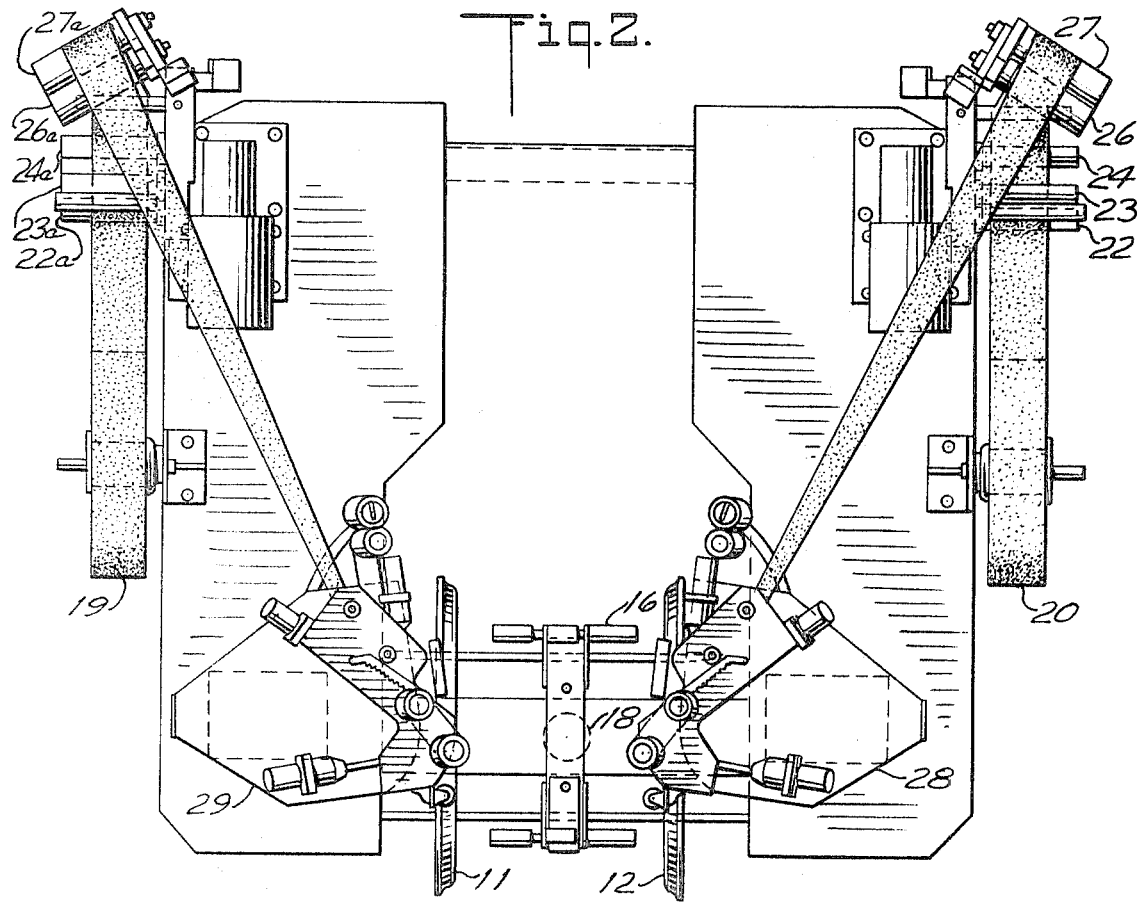
Figure 11A:
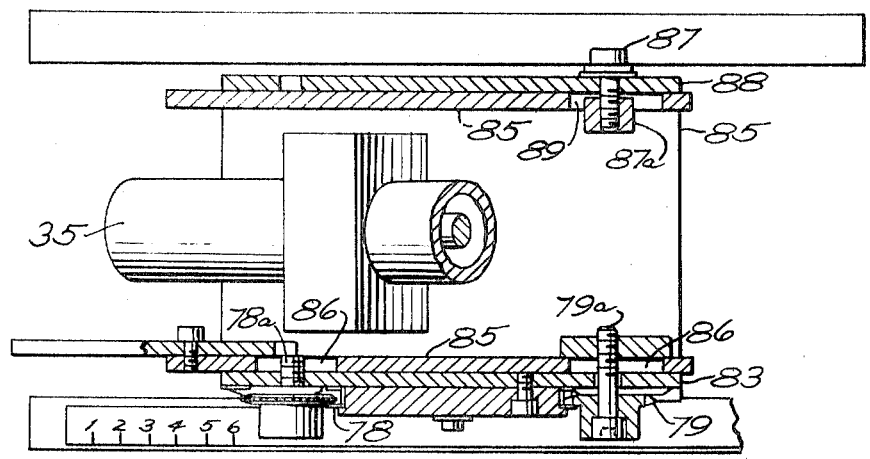
Figure 3:
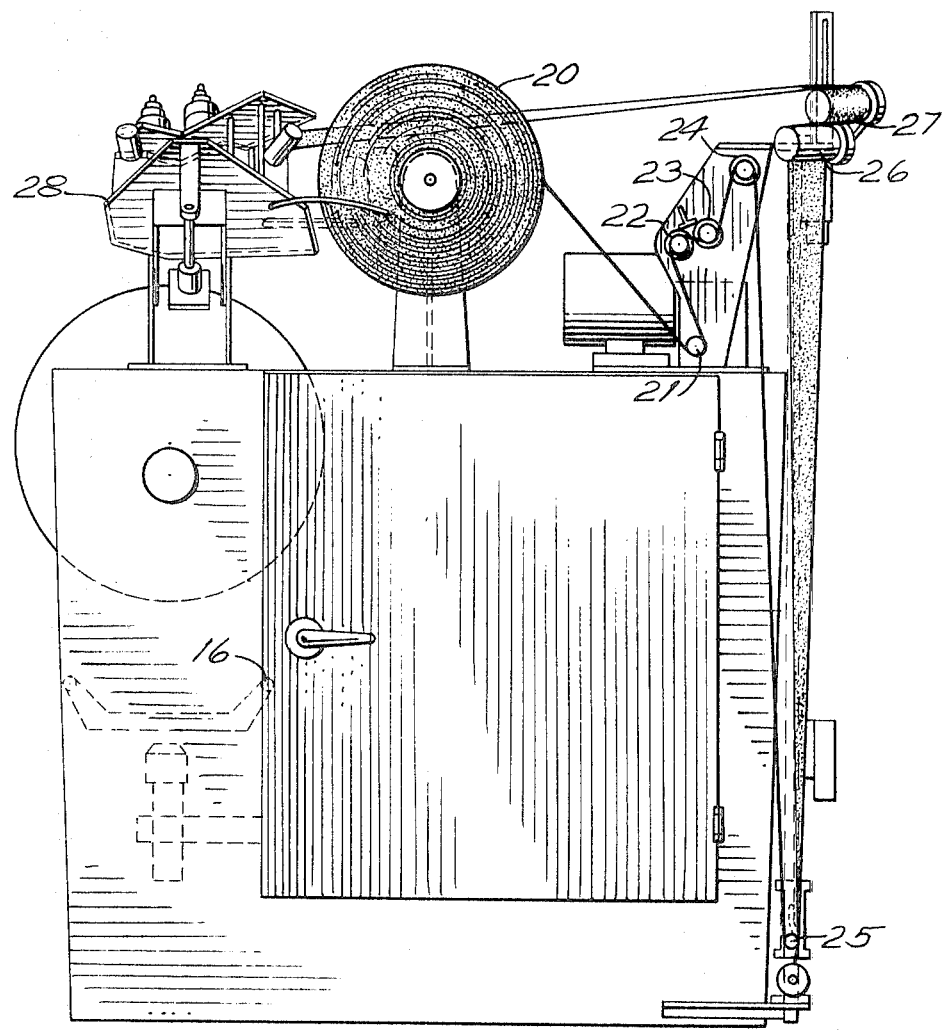
Figure 12A:
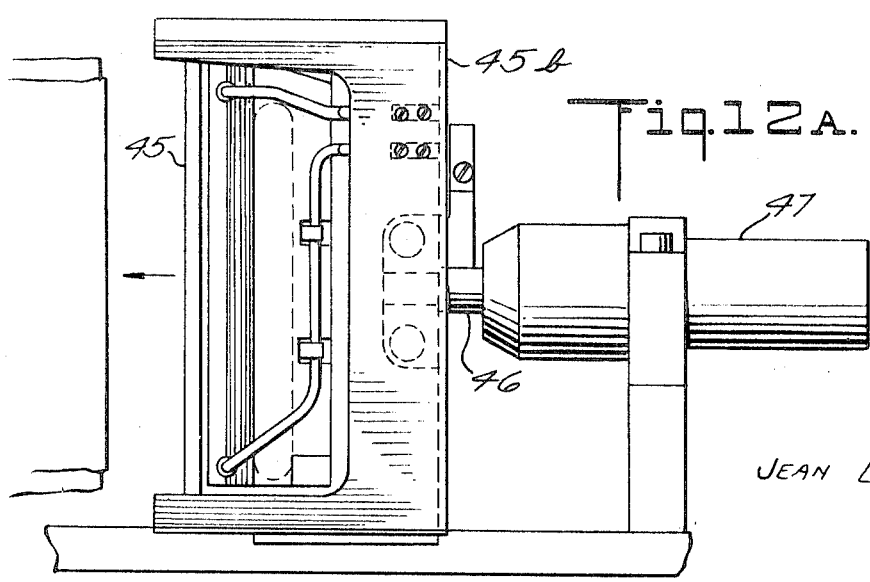
Figure 22:
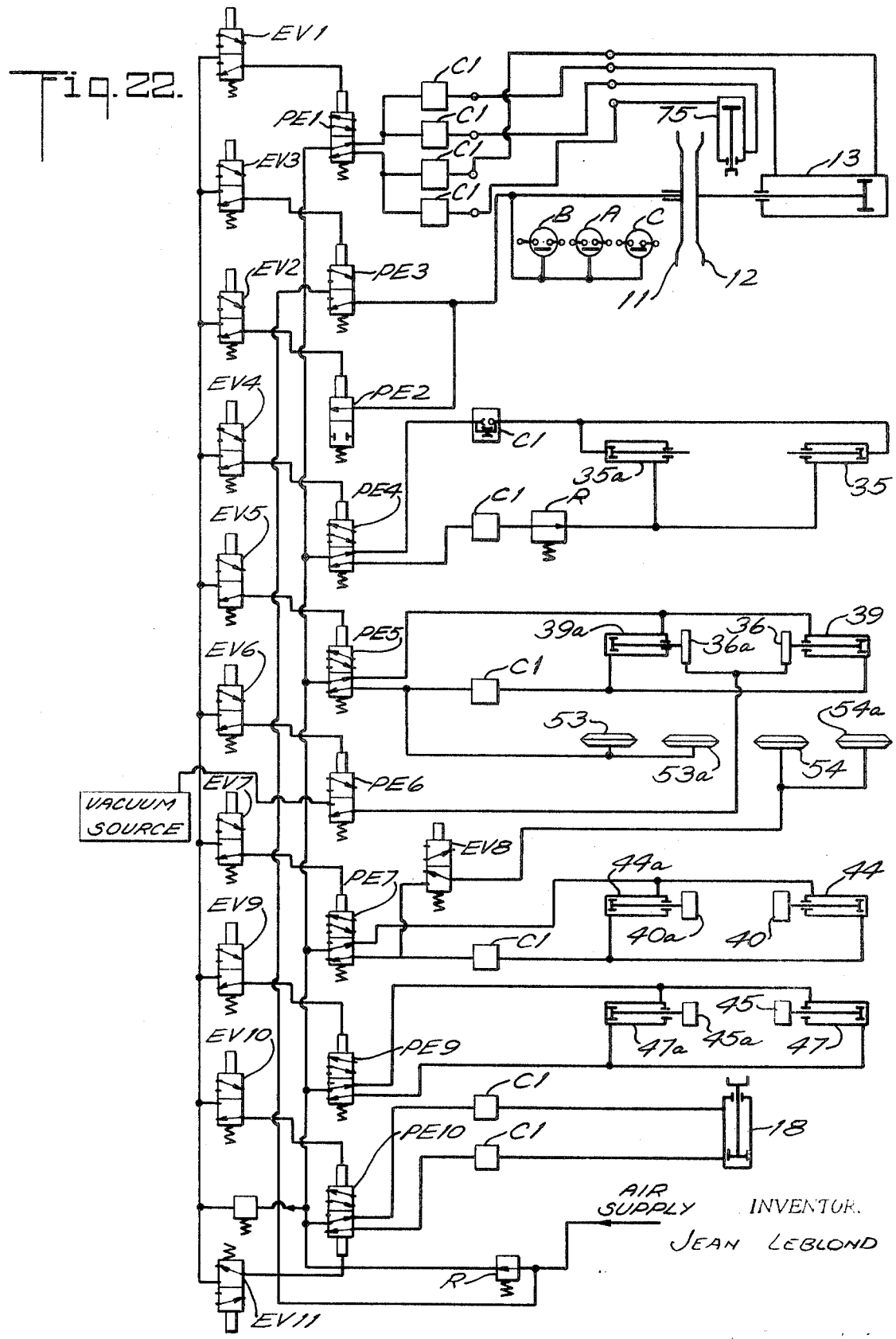
Figure 23A:
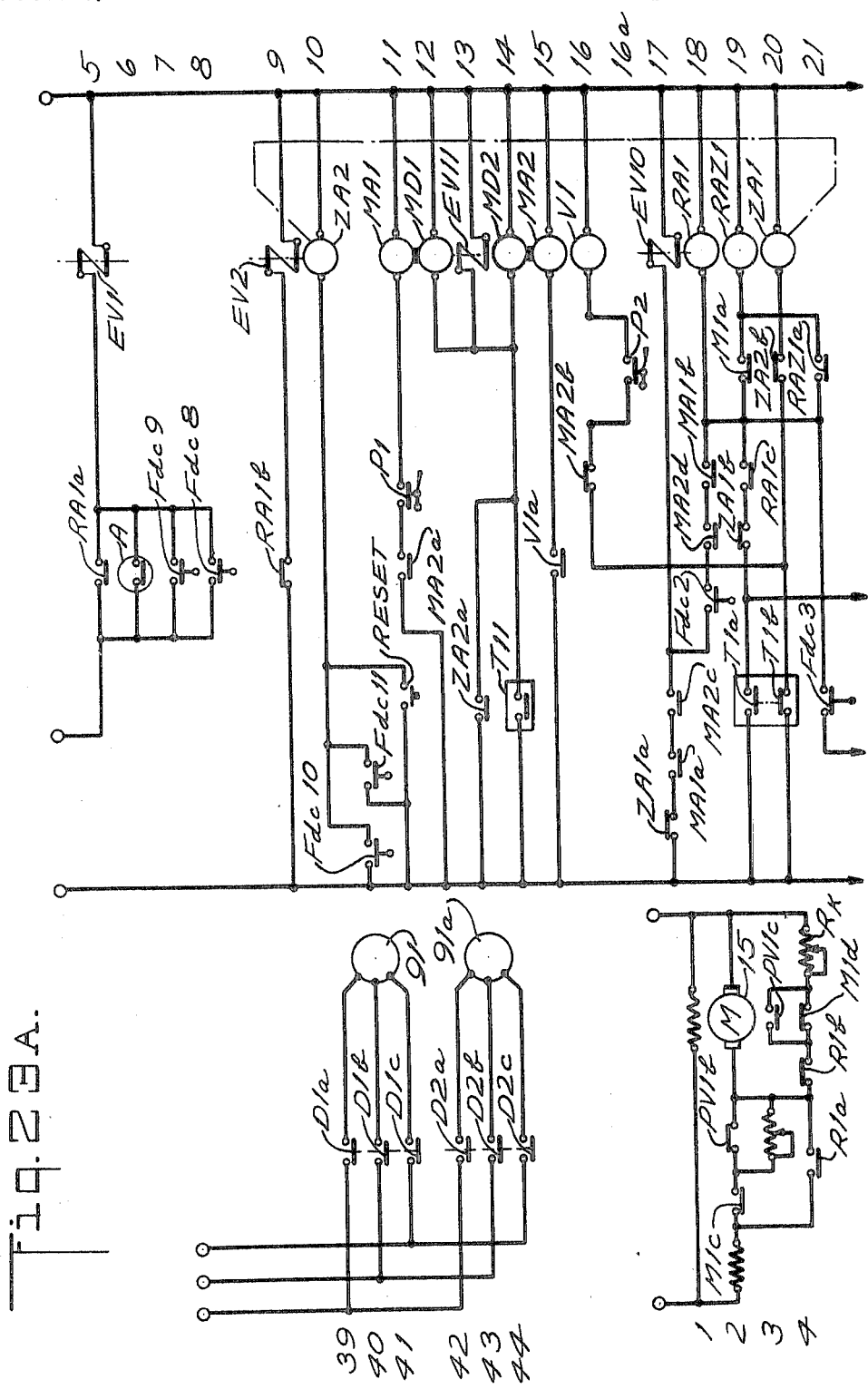
Figure 23B:
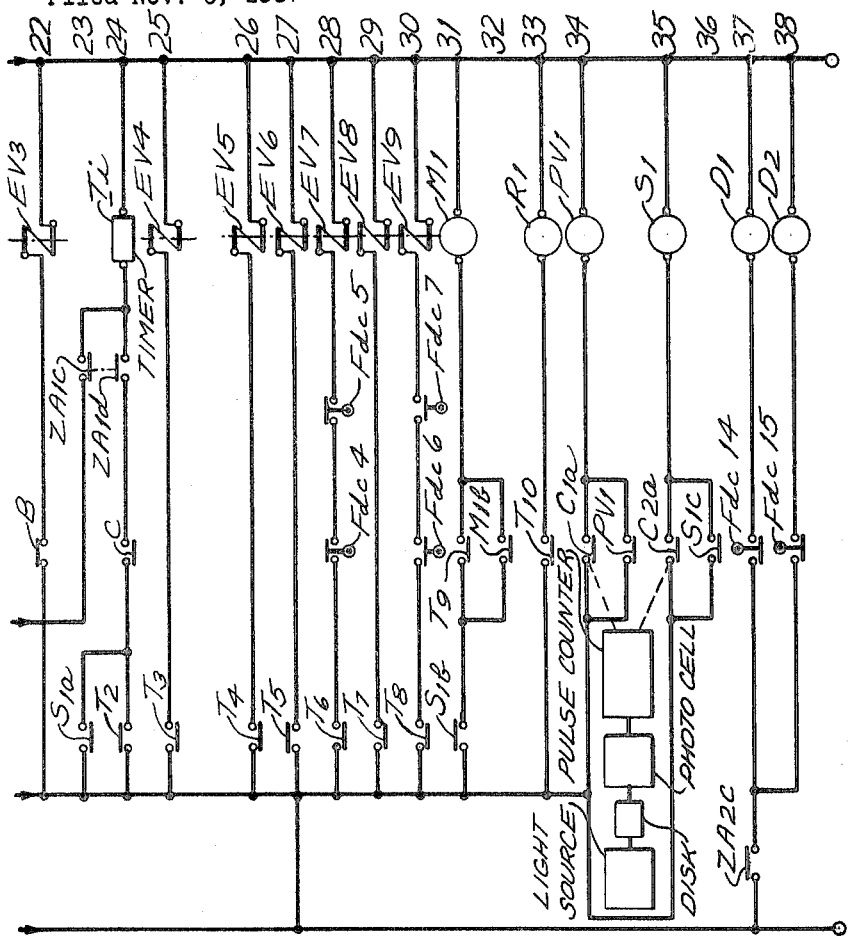
Figure 24:
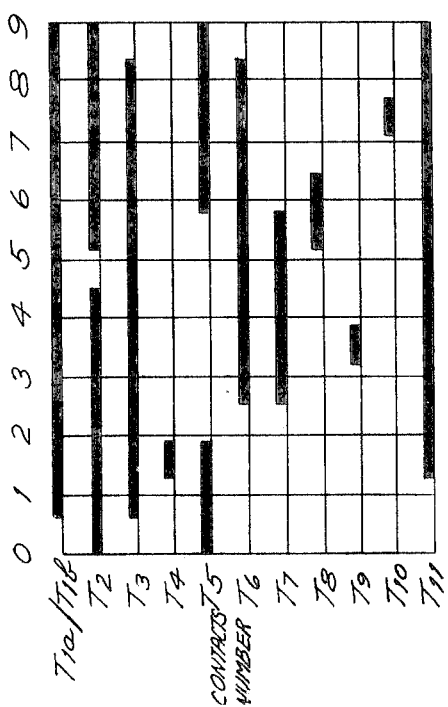

Referring now more particularly to the drawings:
FIG. 1 is a front view of apparatus constructed in accordance with the invention;
FIG. 2 is a plan view of the FIG. 1 apparatus;
FIG. 3 is a side elevational view of the FIG. 1 apparatus;
FIG. 4 is a fragmentary front view of the FIG. 1 apparatus with a tire carcass in its initial position;
FIG. 5 is a fragmentary front view of the FIG. 1 apparatus with a tire carcass positioned for application of a sidewall veneer material;
FIG. 6 is a fragmentary side view, partly in section, of the rotational drive apparatus of the FIG. 1 apparatus;
FIG. 7 is a front view, partly in section, of tire-supporting apparatus taken along line 7—7 of FIG. 6;

FIG. 8 is a view to an enlarged scale of a portion of the rotational drive apparatus for the tire;
FIG. 9 is a side view of a portion of the FIG. 8 drive apparatus, taken along line 9—9 of FIG. 8;
FIG. 10 is a view, in section, taken along line 10—10 of FIG. 9;
FIG. 11 is a side elevational view, partly broken away, of one of the fabric-feeding heads of the FIG. 1 apparatus, to an enlarged scale;
FIG. 11a is a view, in section, taken along line 11a—11a of FIG. 11;
FIG. 12 is a view, in section, taken along line 12—12 of FIG. 11;
FIG. 12a is a fragmentary elevational view to an enlarged scale of the cutting means, taken along line 12a—12a of FIG. 12;
FIG. 13 is a view, in section, taken along line 13—13 of FIG. 12;
FIG. 14 is a view, in section, taken along line 14—14 of FIG. 13, representing a portion of the edge-applying apparatus, pressing roll, and cutter but with the apparatus in its operative cutting position;
FIGS. 15 and 16 are fragmentary elevational views, to an enlarged scale, of a portion of the veneer material feed apparatus;
FIG. 17 is a side view of the tire carcass mounted on the FIG. 1 apparatus with the veneer material on the sidewall;
FIGS. 18, 19, 20 and 21 are diagrammatic views of the FIG. 1 apparatus to aid in explaining the operation of the FIG. 1 apparatus;
FIG. 22 is a diagram of the pneumatic control system of the FIG. 1 apparatus;
FIGS. 23a and 23b are schematic diagrams of the electrical circuits of the FIG. 1 apparatus; and
FIG. 24 is a diagram of the cam operations of the timer of the FIG. 1 apparatus.

For a better understanding of the present invention, together with other and further objects thereof, reference is made to the following description, taken in connection with the accompanying drawings, and its scope will be pointed out in the appended claims.

Referring now more particularly to FIG. 1 of the drawings, there is represented apparatus constructed in accordance with the invention for applying a layer of sheet material to a supporting surface, for example, for applying rubber veneer material to the sidewalls of a tire carcass mounted on the apparatus as will be described subsequently. The apparatus comprises a supporting base 10 having rotatably mounted thereon a pair of disks or rims 11, 12 for supporting a tire carcass therebetween. The rim 12 is axially displaceable toward the rim 11 by means of a cylinder 13 and piston 14. A motor 15 for rotating the rim 11 is represented diagrammatically in FIG. 1. The apparatus also includes a support 16 mounted on the piston 17 of a cylinder 18 for supporting the tire initially during the operation of the apparatus.

As is more clearly represented in FIGS. 2 and 3, the apparatus also includes a pair of supply rolls of rubber veneer material 19, 20 for application to the sidewalls of the tire. The veneer material is fed from the supply roll 20 by means of guide rolls 21, 22, 23 and drive roll 24 to a dancer roll 25. The veneer material is then fed from the dancer roll 25 via guide roll 26 and idler roll 27 to an operating head 28 of the apparatus. As represented in FIGS. 1, 15 and 16, a similar operating head 29 is fed with veneer material in a manner similar to that just described in connection with the head 28. The chain and sprocket drive for roll 24a from motor 91a is represented in FIG. 16. Suitable upper and lower limit switches Fdc10, Fdc14, respectively, are actuated by the sliding member 90a on which dancer roll 25a is mounted.

Referring now more particularly to FIGS. 1, 2, 3 and 11, the head 28 comprises a pair of supporting plates 30, 31, separated by suitable spacer bars 32 and mounted on a suitable base 33 which is slidable along track 85a of frame 85. The frame 85 is adjustably mounted on a suitable frame support 83 and is obliquely disposed relative to the tire carcass. The head 28 is displaceable on the base 33 by means of cylinder 35 and piston 36.

Referring now more particularly to FIGS. 12, 13 and 14, the head 28 supports means for applying the leading edge of the veneer material to the tire sidewall, means for pressing the veneer material onto the rotating tire sidewall, and means for cutting the material on the pressing means. The means for applying the veneer material to the tire sidewall comprises a displaceable applicator arm 37 having a vacuum chamber 36 mounted on piston 38 of cylinder 39. The arm 37 has a rack portion 37b (FIG. 13) engaging a freely rotatable pinion 37c having an upper toothed face, as will be mentioned subsequently. The arm 37 actuates limit switch Fdc4 to close the same when arm 37 is in withdrawn, i.e. retracted, position.

The veneer material V fed to the head 28 is guided by a guide means 95 and is fed between rolls 59a, 59b to the vacuum chamber 36. Pressure of roll 59b on roll 59a is maintained by spring 59d through pivoted links 59c, 59c'. A plastic backing sheet P is fed around the roll 59b to a take-up roll 96. Pressure of roll 96a on roll 96 is maintained by spring 96c through pivoted arm 96b. Guide means 95 is in the form of a plate member parallel to upper and lower frame plates 30 and 31 and supported by a pair of threaded shafts 100 which extend through and are in turn supported by plate 30. The height of guide plate 95 above the lower frame plate 31 can be adjusted to the breadth of the veneer material by adjustment of the nut 101 and clutch 102 to displace the respective shaft 100 axially. The veneer material may thus be guided by its side edges between the lower frame plate 31 and guide plate 95.

The pressing means comprises a roll 40 displaceable in slot 41 by means of bar 42 under the control of piston 43 of cylinder 44. As represented in FIG. 11, the bar 42 is linked to the bar 40 by a suitable member 48 for displacing the roller 40 in the slot 41. Referring again to FIG. 12, member 43a on piston 43 actuates limit switch Fdc7 when the piston 43 is extended.

The cutting means comprises an electrically heated cutter element 45 supported in frame 45b attached to piston 46 of cylinder 47, as represented in FIGS. 12, 12a and 14.

Referring to FIGS. 11 and 13, the roll 40 is mounted on ball bearings 49 on the supporting plates 30, 31. A suitable gear 50 is rotatably mounted on ball bearings 51 around shaft 52 supporting roll 40. The shaft 52 extends into a suitable pneumatic clutch 54 having a finger 54' which engages an upper toothed face 55 of the gear 50 when the clutch 54 is actuated through air inlet 56. A spring 54" maintains the clutch in the disengaged position in the absence of applied air pressure. The gear 50 is coupled by means of a suitable chain (not shown) to gear 57 which is mounted on shaft 58 and forms a member of a similar pneumatic clutch 53 having a finger 57a for engaging the upper toothed face of the pinion 37c upon the application of air pressure to inlet 56a. The shaft 58 supports roll 59a and is mounted in suitable bearings 60, 60 in the supporting plates 30, 31. Drive to the backing sheet take-up roll 96 (FIG. 12) is supplied by a sprocket 59d and chain 59e driven by the roll 59a.

Referring now more particularly to FIGS. 6 and 7, the support 16 is represented to an enlarged scale. The tire is initially supported between rollers 61, 62 mounted on arms 63, 64, respectively, attached to piston 17. A spring-loaded finger 65 pivoted on the arm 63 is depressed by the tire to release limit switch Fdc2. The rolls 61 and 62 are spring-loaded to allow lateral displacement when the tire moves on the rolls.

The rotary drive for the tire comprises a motor 15 coupled through a suitable transmission 67 to the shaft of the mounting rim 11. A suitable spring-loaded idler gear 68 is utilized to adjust tension of the drive chain 69.

An optical disk 70 having uniformly spaced apertures 71 along the circumference thereof is utilized in conjunction with a suitable light-source, photoelectric-cell and preset pulse-counter to provide a means of counting the revolutions of the motor 15, as will be more fully described subsequently.

Referring now to FIG. 8, the rotary mounting of the rims 11, 12 is represented in section. A suitable air passage 11a is utilized to inflate the tire. As represented in FIGS. 8, 9 and 10, the cylinder 13 is adjustably positioned with respect to the frame of the FIG. 1 apparatus by means of a screw 72. A finger 74 operated by a cylinder 75 is utilized to lock the piston of the cylinder 13 when it is extended and to actuate limit switch Fdc3.

Referring now to FIGS. 11 and 11a, the head 28 is positioned at a selected angle by means of sprockets 78, 79 interlocking with rigidly mounted chain 80. These sprockets are mounted on suitable screws 78a, 79a which extend through vertical slots 81 and 82 in support member 83. The screws extend through suitable lateral slots 86 on the frame 85 on which the cylinder 35 is mounted. The slots 86 allow lateral displacement of the frame 85 relative to the screws when the angle of the head 28 is changed. A similar screw 87 is utilized to position the frame 85 along the other support member 88 with the nut 87a seated against vertical movement in a horizontal slot 89 of frame 85. The screws 78a and 79a have socket hex-heads and are relatively turnable with respect to the sprockets 78 and 79 respectively. For angular adjustment of head 28, the screws 78a, 79a are loosened and the respective sprocket rotated thereabout thus moving along chain 80 until the desired angle is achieved. Then the screws 78a and 79a are once more tightened.

Figure 20:
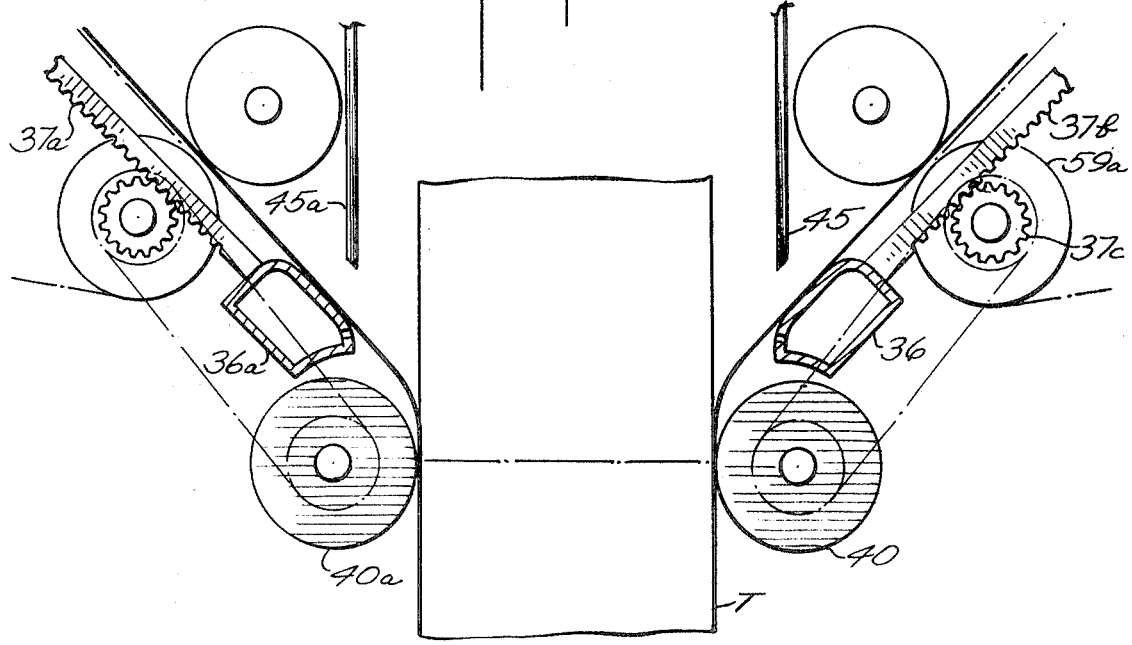
Figure 21:
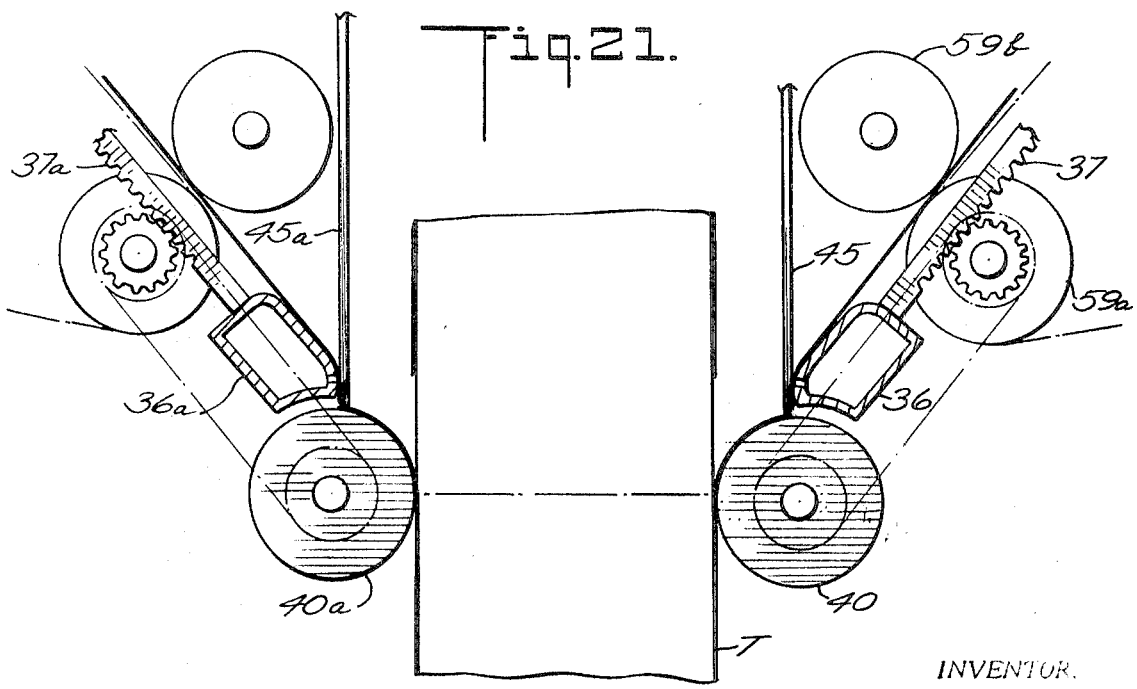

Considering now the operation of the FIG. 1 apparatus with reference to FIGS. 4 and 5 and with reference to the schematic representations of FIGS. 18–21 inclusive, the tire carcass T is positioned on the support 16 with the rim 12 withdrawn, as represented in FIG. 4. After the rim 12 is displaced toward the rim 11, the heads 28, 29 move into operating positions represented in FIG. 5. The positions of the applicator arms, the pressing rolls and the cutters are represented diagrammatically in FIG. 18. The applicator arms 37, 37a apply the veneer material V to the tire carcass T, as represented in FIG. 19. The applicator arms then withdraw and the pressing rolls 40, 40a press the veneer material onto the sidewalls of the tire carcass as the tire carcass rotates, as represented in FIG. 20. When the tire carcass has rotated approximately a complete revolution, the cutters 45, 45a cut the venner material on the pressing rolls, as represented in FIG. 21.

Considering now the operation of the FIG. 1 apparatus with reference to FIGS. 22, 23a, 23b and 24, when the start pedal is depressed, contacts P1 and P2 (lines 11 and 16a) close and control relay V1 (line 16) is energized through normally closed contacts MA2b and timer contacts T1b of a timer T, which may be of any conventional type, for example, having sets of contacts controlled by synchronous motor-driven cams. Contacts V1a (line 15) close, energizing winding MA2 of a conventional latch relay.

Latch relay winding MA2 is associated with latch relay winding MD2 to control the same set of contacts. When relay winding MA2 is momentarily energized the contacts shift from the position represented in the drawings into their alternate positions where they are mechanically latched until the assocaited winding MD2 is momentarily energized to release the latch and cause the contacts to return to the position represented in the drawing. The apparatus also includes latch relay MA1, MD1 and latch relay ZA1, ZA2. Only the contacts of latch relay ZA1, ZA2 are represented in their position corresponding to latching after energization of relay winding ZA1 since relay winding ZA2 is never energized during normal operation.

Relay contacts MA2a (line 11) close when relay winding MA2 is energized, energizing latch relay winding MA1. Solenoid valve EV10 (line 17) is then energized through contacts MA1a (line 18), MA2c (line 18) and ZA1a (line 18). Contacts MA2b (line 16) open, de-energizing relay V1. When solenoid valve EV10 is energized, pneumatic pressure is applied to solenoid valve PE10 (FIG. 22) to shift the position of that valve and cause the piston 18 to raise the tire support 16.

The limit switches designated Fdc in FIGS. 23a and 23b are represented in their deactivated condition. When limit switch Fdc2 (line 18) is released by arm 65 (FIG. 6) contacting the tire carcass, relay RA1 (line 18) is energized through contacts MA1b, MA2d, Fdc2, MA2c, MA1a and ZA1a. Relay contacts RA1a (line 5) close, energizing solenoid valve EV1, causing the application of pneumatic pressure to valve PE1, shifting the position of that valve to apply pressure to the cylinder 13 to cause the rim 12 to approach the rim 11 and grip the beads of the tire carcass. When the rim 12 is properly positioned, the finger 74 locks the position of the piston 14 of the cylinder 13, actuating limit switch Fdc3 (line 21). In the meanwhile, latch relay winding ZA1 (line 20) has been energized through relay contacts ZA2b and timer contacts T1b, placing contacts ZA1a (line 17) in the closed position until the corresponding latch relay winding ZA2 (line 10) is subsequently energized, which condition does not occur in normal operation. The closing of limit switch Fdc3 energizes solenoid valve EV3 (line 22) through contacts MA1b, MA2d, Fdc2 (line 18), contacts MA2c, MA1a and latch relay contacts ZA1a (line 17) to shift the position of valve PE3 of FIG. 22 and inflate the tire carcass. The contacts of manometer A then close in response to the inflation pressure to maintaine solenoid valve EV1 energized until pressure is subsequently released. Contacts of manometer B open if the pressure becomes excessive. Contacts of manometer C close in response to the inflation pressure and open if there is a failure of pressure.

The timer T is energized through contacts ZA1d, manometer C, timer contacts T2 and limit switch Fdc3. The sequencing of the timer is represented in the chart of FIG. 24. The bar lines on the chart of FIG. 24 indicate the positions or times during the sequence when the contacts of the timer are closed. The timer contacts are represented in FIGS. 23a and 23b in their initial operating conditions. As the timer progresses through its sequence, contacts T1a and T3 close and contacts T1b open between positions 0 and 1, de-energizing latch relay winding ZA1 (line 20) and relay V1 (line 16). Latch relay winding MA2 (line 15) is, in turn, de-energized.

When contacts T3 close, solenoid valve EV4 (line 25) is energized, causing valve PE4 to shift position and thereby apply pressure to a suitable check valve C1, having a by-pass restriction, and relief valve R to cylinders 35 and 35a to shift the position of the FIG. 1 heads against the tire carcass. Similar valves are designated by similar reference numerals in FIG. 22. The valves C1 are conventional valves of the type which allow a fluid to pass fully in one direction but restrict passage of the fluid in the opposite direction, the extent of such restriction being adjustable.

When the timer position is between positions 1 and 2, contacts T4 close briefly and contacts T11 close. When contacts T4 close, solenoid valve EV5 (line 26) is energized, applying pressure to valve PE5 to shift the positions of that valve and apply pressure through check valve C2 to cylinders 39 and 39a to carry the veneer material for application to the tire carcass by means of the arms 37, 37a and vacuum chambers 36, 36a. Also, pressure is applied through valve PE5 to pneumatic clutch 53 (FIG. 13) and to its counterpart 53a on the other head, causing the finger 57a (FIG. 13) to engage the pinion 37c, thereby coupling the rack 37b to shaft 58 and roll 59a to supply drive to the roll from the rack. Until contacts T5 open, solenoid valve EV6 (line 27) is energized, causing valve PE6 to be in position to apply vacuum to the vacuum chambers 36, 36a (FIG. 12).

When contacts T11 close, latch relay windings MD1 (line 12) and MD2 (line 14) are energized, thereby shifting the position of the latch relay contacts of MA1 and MA2. When contacts MA2c (line 17) open, solenoid valve EV10 is de-energized and the piston of cylinder 18 is lowered to remove the tire support from contact with the tire.

When timer contacts T4 open between positions 1 and 2, solenoid valve EV5 is de-enerized, relieving pressure in the cylinders 39 and 39a to withdraw the applicator arms and disengaging the pneumatic clutch 53 and its counterpart 53a on the other head. At that time, the timer contacts T5 open, causing valve EV6 to be de-energized, returning valve PE6 to the condition represented in the drawing to disconnect the vacuum from the applicator arms to release the veneer material.

Between timer positions 2 and 3, the contacts T6 and T7 close, energizing solenoid valves EV7 and EV8, respectively, provided safety limit switches Fdc4 and Fdc5 are closed, indicating that the applicator arms have been withdrawn. When solenoid valve EV7 is energized, pressure is applied to valve PE7, causing that valve to shift its position and thereby apply pressure to cylinders 44 and 44a to position the pressing rolls 40, 40a against the tire carcass. At that time pressure is applied through solenoid valve EV8 to the pneumatic clutch 54 (FIG. 13) and its counterpart 54a on the other head, to engage the gear 50 with the roll 40, thereby enabling the roll 40 to drive the gear 57 and the roll 59a.

When the timer is between positions 3 and 4, contacts T9 close briefly, energizing relay M1 (line 31) which has holding contacts M1b. Contacts M1c (line 47) close, causing the motor 15 to rotate the tire carcass to apply the veneer material thereto and causing the pressing roll 40 to rotate and to drive roll 59a in the manner previously described.

When the timer is between positions 4 and 5, contacts T2 open, stopping the timer. While the carcass continues to rotate, electrical impulses generated by the photoelectric cell, responsive to light through the apertures 71 in the disk 70, are counted by a pulse counter of a conventional type having normally open output contacts C1a and C2a (lines 34 and 35). The counter may, for example, be a pair of preset counters or may be a dual preset counter which energizes an output relay when a first preselected count is reached and which energizes a second output relay when a second pre-selected count is reached. When a preselected number of pulses have been counted, representing that almost a complete revolution of the tire carcass has occurred, the counter contacts C1a close, energizing relay PV1 (line 34), opening contacts PV1b (line 2) and closing contacts PV1c (line 3) to introduce additional resistance into the motor circuit to cause the motor to rotate slowly until an additional predetermined count of impulses has been reached, indicating that the carcass has revolved a complete revolution. The counter contacts C2a then close, energizing relay S1. When relay contacts S1a (line 23) close, the timer is again started.

When the timer is between positions 5 and 6, contacts T2 again close. Contacts T8 close and contacts T5 close. Solenoid valve EV9 is energized through contacts T8 and through limit switches Fdc6 and Fdc7, which are closed when actuated with the pressing rolls 40a, 40, respectively, in their extended positions. When the solenoid valve EV9 is energized, pressure is applied to the valve PE9 to shift the position of that valve to actuate the cylinders 47, 47a to cut the veneer strips on the pressing rolls. Solenoid valve EV6 is energized through contacts T5, thereby applying vacuum to the veneer material after the cut to hold the veneer strip.

Also, when the timer is between positions 5 and 6, contacts T7 open, de-energizing solenoid valve EV8 and thereby disconnecting the drive for the roll 59a of FIG. 13.

When the timer 13 is between positions 6 and 7, contacts T8 open, thereby de-energizing solenoid valve EV9 to return the cutters 45, 45a to their initial positions.

Between timer positions 7 and 8, contacts T10 close briefly, thereby energizing briefly relay R1 (line 33). When relay contacts R1a (line 4) close and relay contacts R1b (line 4) open, the motor 15 rotates to apply the final short length or trailing edge of cut veneer material to the tire carcass to overlap slightly the leading edge of veneer material, as represented in FIG. 17. When relay R1 is de-energized, relay contacts R1a open and the motor 15 stops, thereby stopping the rotation of the carcass.

When the tire is between position 8 and position 9, contacts T3 open and contacts T6 open. When contacts T3 open, solenoid valve EV4 is de-energized, causing the heads 28, 29 (FIG. 1) to be withdrawn. When contacts T6 open, solenoid valve EV7 is de-energized, causing the pressing rolls to be withdrawn on the heads.

When the timer reaches position 9, contacts T1a open to stop the timer and de-energize relay RA1, de-energizing solenoid valves EV2 and EV1 and contacts T11 open to de-energize relay windings MD1 and MD2. The timer is then in its initial condition, that is, position 9 corresponds to position 0.

Lower limit switches Fdc14 and Fdc15, which are actuated and closed when the dancer rolls 25, 25a are not at their respective lower limit positions, control the energization of relays D1 and D2 to cause the motors 91 and 91a, supplying the veneer material, to stop the unwinding operations when the respective dancer roll reaches the lower limit position determined by the limit switches. Upper limit switches Fdc10 and Fdc11, which are actuated and are open when the dancer rolls are not at the upper limit position, act as safety switches, and close, energizing the latch relay winding ZA2 to stop and reset the apparatus if an upper limit is reached. The counter may be automatically reset to zero by contacts (not shown) of relay winding RAZ.

Limit switch Fdc8 (FIG. 11) and its counterpart on the other head, Fdc9, are actuated and open when the heads 28, 29 are withdrawn from the tire carcass.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. Apparatus for applying a layer of sheet material to at least one sidewall of a tire carcass comprising:
    applicator means movable substantially into and out of contact with the sidewall of the tire carcass for applying the leading edge of the sheet material thereto;
    drive means for rotating the tire carcass to apply a layer of the sheet material around the sidewall;
    presser means movable substantially into and out of contact with the tire carcass independently of said applicator means for pressing the sheet material onto the rotating sidewall of the tire carcass;
    severing means for severing the sheet material in the region of said sidewall; and
    control means operatively connected with said severing means for actuating the latter, to sever said sheet material at a predetermined location spaced from but in the region of the sidewall so that when applied to the sidewall the trailing edge of the severed sheet material will be in a predetermined position with respect to the leading edge.

2. Apparatus according to claim 1, wherein said severing means is adapted to cooperate with said pressing means for severing the trailing edge of the sheet material on said pressing means while said pressing means is in engagement with said carcass.

3. Apparatus according to claim 2, wherein said control means is operatively connected to said drive means to stop the rotation of the tire carcass after a predetermined amount of rotation preparatory to actuating said severing means.

4. Apparatus in accordance with claim 3 in which said control means is effective to cause said drive means to continue the rotation of the tire carcass after the occurrence of the cut to apply the trailing edge of the cut material to the sidewall.

5. Apparatus in accordance with claim 1 in which said application means comprises a vacuum applicator displaceable transversely of the sidewall for transporting the sheet material therewith.

6. Apparatus in accordance with claim 5 in which said vacuum applicator holds the sheet material after the occurrence of the cut.

7. Apparatus in accordance with claim 1 in which said pressing means comprises a roll displaceable transversely of the sidewall, said severing means cooperating with said presser means for cutting said sheet material on one portion of said roll while another circumferentially spaced portion of said roll is in engagement with said sidewall.

8. Apparatus in accordance with claim 1 in which said severing means comprises a heated cutting edge.

9. Apparatus in accordance with claim 3 in which said control means comprises a light source and an optical disk rotated by said drive means for generating optical impulses representative of the amount of rotation of said drive means, and control circuit means responsive to said optical impulses for starting and stopping said drive means.

10. Apparatus in accordance with claim 1 in which said control means is effective to sequentially initiate actuation of said application means, said drive means, said presser means and said severing means.

11. Apparatus for applying a layer of rubber veneer material to each sidewall of a tire carcass comprising:
    means, including a pair of rotatable rims for mounting a tire carcass thereon, for rotating the tire carcass;
    a pair of supports each having mounted thereon applicator means for applying the leading edge of the sheet material to the sidewall of the tire carcass, presser means for pressing the sheet material onto the sidewall of the tire carcass, and means for cutting the sheet material on the pressing means;
    said supports being displaceable transversely of the tire carcass for moving said edge-applying means, said presser means, and said cutting means into a position in proximity with the tire carcass;
    control means for controlling the rotating means to stop the rotation of the tire carcass after approximately a complete single rotation;
    said control means being effective to continue the rotation of the tire carcass after the occurrence of the cut to apply the trailing edge of the cut material to the tire carcass;
    said applicator means and said presser means being movable independently of one another into and out of contact with the sidewall of the tire carcass from said position in proximity with the tire carcass.

12. Apparatus for applying a layer of rubber veneer material to each sidewall of a tire carcass comprising:
    means, including a pair of rotatable rims for mounting a tire carcass thereon, for rotating the tire carcass;
    a pair of supports each having mounted thereon applicator means for applying the leading edge of the sheet material to the sidewall of the tire carcass, means for pressing the sheet material onto the sidewall of the tire carcass, and means for cutting the sheet material;
    said supports being displaceable transversely of the tire carcass for moving said applicator means, said presser means, and said cutting means into a position in proximity with the tire carcass, said applicator means and said presser means being movable independently of one another into and out of contact with the sidewall of the tire carcass from said position in proximity with the tire carcass.

13. Apparatus according to claim 12, further comprising control means for controlling the rotating means to stop the rotation of the tire carcass after approximately a complete single rotation;

said control means being effective to continue the rotation of the tire carcass after the occurrence of the cut to apply the trailing edge of the cut material to the tire carcass.

14. Apparatus according to claim 12, wherein said cutting means is located in the region of, and cooperates with, said pressing means for cutting the sheet material on said pressing means.

15. The apparatus according to claim 1 wherein said applicator means includes an applicator member having a leading end portion for supporting the leading edge of the sheet material and movable between a first position in which said leading end portion thereof is substantially in contact with the sidewall of the tire carcass when said presser member is spaced from the tire carcass and a second position adjacent a first portion of said presser member and spaced from the tire carcass when a second portion of said presser member is substantially in contact with the tire carcass, said severing means cooperating with said first portion of said presser member and said applicator means for severing the sheet material on said first portion of said presser member adjacent said leading end portion of said applicator means when said applicator means is in said second position thereof.

References Cited

UNITED STATES PATENTS

| | | | |
|---|---|---|---|
| 1,327,910 | 1/1920 | Harsel | 156—405X |
| 1,635,134 | 7/1927 | McCreedy | 156—405X |
| 3,427,215 | 2/1969 | Crocker | 156—408 |
| 1,645,397 | 10/1927 | Perrault | 156—406 |
| 1,817,515 | 8/1931 | Johnson | 156—415UX |
| 1,854,813 | 4/1932 | Swern | 156—415 |
| 1,938,787 | 12/1933 | Abbott | 156—405 |
| 3,479,238 | 11/1969 | Kehoe et al. | 156—405X |

OTHER REFERENCES

Truxal, John G., Control Engineers' Handbook, 1958, pp. 17–79 and 17–80.

SAMUEL W. ENGLE, Primary Examiner

S. C. BENTLEY, Assistant Examiner

U.S. Cl. X.R.

156—408, 415